United States Patent [19]

Frearson

[11] Patent Number: 4,804,023

[45] Date of Patent: Feb. 14, 1989

[54] HYDRAULIC FLUID REPLENISHMENT DEVICE

[75] Inventor: William H. Frearson, Letchworth, England

[73] Assignee: Avdel Limited, British Company, Hertfordshire, England

[21] Appl. No.: 51,328

[22] Filed: May 19, 1987

[30] Foreign Application Priority Data

May 23, 1986 [GB] United Kingdom ................ 8612689
Jun. 20, 1986 [GB] United Kingdom ................ 8615100

[51] Int. Cl.⁴ ............................................ F16D 65/24

[52] U.S. Cl. ...................................... 141/65; 141/59; 188/352

[58] Field of Search ................ 141/1, 2, 5, 18, 39–43, 141/21, 47, 52, 59, 60, 65, 94, 98, 100, 113, 236, 249, 351, 357, 363, 366; 417/435; 184/28, 29, 32, 37, 38.1, 39; 138/26; 188/352; 60/584

[56] References Cited

U.S. PATENT DOCUMENTS

| | | | |
|---|---|---|---|
| 1,617,020 | 2/1927 | Merwin | 188/352 |
| 2,645,314 | 7/1953 | Lackinger | 188/352 |
| 3,059,671 | 10/1962 | Kings | 188/352 |
| 3,154,087 | 10/1964 | Beaver | 188/352 X |
| 4,009,739 | 3/1977 | Weatherford | 141/59 |
| 4,144,913 | 3/1979 | Akers et al. | 141/2 |
| 4,350,185 | 9/1982 | Quist | 141/59 X |
| 4,392,784 | 7/1983 | Hanafi | 417/435 X |

FOREIGN PATENT DOCUMENTS 0092469 10/1983 European Pat. Off. ............ 188/352

*Primary Examiner*—Henry J. Recla
*Assistant Examiner*—Ernest G. Cusick
*Attorney, Agent, or Firm*—Oblon, Fisher, Spivak, McClelland & Maier

[57] ABSTRACT

A device for automatically replenishing and exchanging hydraulic fluid in the hydraulic system (such as that of a fastener placing tool 31) has a lower reservoir (29) for holding new hydraulic fluid (39) and an upper reservoir (28) for receiving old hydraulic fluid. The device connects with the system to be replenished by means of a single hydraulic fluid connection (17) at the bottom of the lower reservoir (29). An entry port (25) to the second reservoir is positioned opposite the connection (17) at the bottom end of a tube (23) leading to the top of the second reservoir. In use, the device is connected to the hydraulic system through the connection (17) and the system is pressurized. Old hydraulic fluid is forced up through the connection (17) at high speed and passes through the new hydraulic fluid (39) in the lower reservoir (29), through the port (25), up the tube (23) and down into the upper reservoir (28) where it is retained. When the system is depressurized, new hydraulic fluid (39) is drawn down through the same connection (17) into the hydraulic system.

16 Claims, 5 Drawing Sheets

HYDRAULIC FLUID REPLENISHMENT DEVICE

BACKGROUND OF THE INVENTION

1. Field of the Invention

The invention relates to a hydraulic fluid replenishment device. More particularly, it relates to such a device for use with a hydraulic system embodied in a portable tool, under works or factory-floor conditions.

2. Background of the Related Art

By a replenishment device is meant a device which will allow the addition of new hydraulic fluid to a system to replace fluid lost e.g. by leakage. Such loss leaves air in the system, and it is necessary to remove this air. Preferably this air is removed by pressurizing the hydraulic system to force the air out. In practice, some old hydraulic fluid, which may be mixed with air bubbles, may also be forced out of the system, in order to ensure that all the air has been removed.

It is common to replenish the hydraulic fluid in a hydraulic system by means of a hydraulic pump. However, such apparatus is large, heavy, expensive and complicated to use. When the hydraulic system to be replenished is embodied in a hand-held tool, for example a hand-held blind-rivet installation gun, there is a need for a replenishment device which is small, lightweight, inexpensive and easy to use. The device should also provide for the removal of air, and any old hydraulic fluid mixed with it, from the system before feeding new hydraulic fluid to it, and should not allow old hydraulic fluid to contaminate the new fluid.

Summary of the Invention

The present invention provides, in one of its aspects, a hydraulic fluid replenishment device for replenishing hydraulic fluid in a hydraulic system, which device comprises:

a first reservoir for holding old hydraulic fluid removed from the system;

a second reservoir for holding new hydraulic fluid to be added to the system;

a single hydraulic fluid connection for connecting the replenishment device to the hydraulic system, through which connection old hydraulic fluid enters the device and new hydraulic fluid leaves the device;

an entry port to the first reservoir which entry port is opposite the aforesaid hydraulic fluid connection; means for trapping old hydraulic fluid, which has entered the first reservoir through the entry port, against return through the entry port;

whereby, when the replenishment device is connected to the hydraulic system by means of the aforesaid single connection and the hydraulic system is pressurised (i.e. is subjected to positive hydraulic pressure), air and/or old hydraulic fluid enters the device at speed through the single connection and due to its speed and momentum passes through the entry port into the first reservoir and the old oil at least is trapped therein;

and when the hydraulic system is thereafter depressurised (i.e. is subjected to negative hydraulic pressure), new hydraulic fluid is drawn through the single connection from the second reservoir into the hydraulic system.

The invention provides, in another of its aspects, a hydraulic fluid replenishment device for replenishing hydraulic fluid in a hydraulic system, which comprises:

a first reservoir for holding old hydraulic fluid removed from the system;

a second reservoir for holding new hydraulic fluid to be added to the system;

a single hydraulic fluid connection for connecting the replenishment device to the hydraulic system, through which connection old hydraulic fluid enters the device and new hydraulic fluid leaves the device;

an entry port to the first reservoir which entry port is opposite the aforesaid hydraulic fluid connection; means for trapping old hydraulic fluid, which has entered the first reservoir through the entry port, against return through the entry port;

an exit port from the second reservoir adjacent the single connection;

whereby, when the replenishment device is connected to the hydraulic system by means of the aforesaid single connection and the hydraulic system is pressurised (i.e. is subjected to positive hydraulic pressure), air and/or old hydraulic fluid enters the device at speed through the single connection and due to its speed and momentum passes through the entry port into the first reservoir and the old fluid at least is trapped therein;

and when the hydraulic system is thereafter depressurised (i.e. is subjected to negative hydraulic pressure), new hydraulic fluid leaves the second reservoir through the exit port and is drawn through the single connection into the hydraulic system.

Further features of the invention will become apparent from the accompanying description and claims.

BRIEF DESCRIPTION OF THE DRAWINGS

A specific embodiment of the invention will now be described by way of example and with reference to the accompanying drawings, in which.

DETAILED DESCRIPTION OF THE PREFERRED EMBODIMENTS

Figure 1:
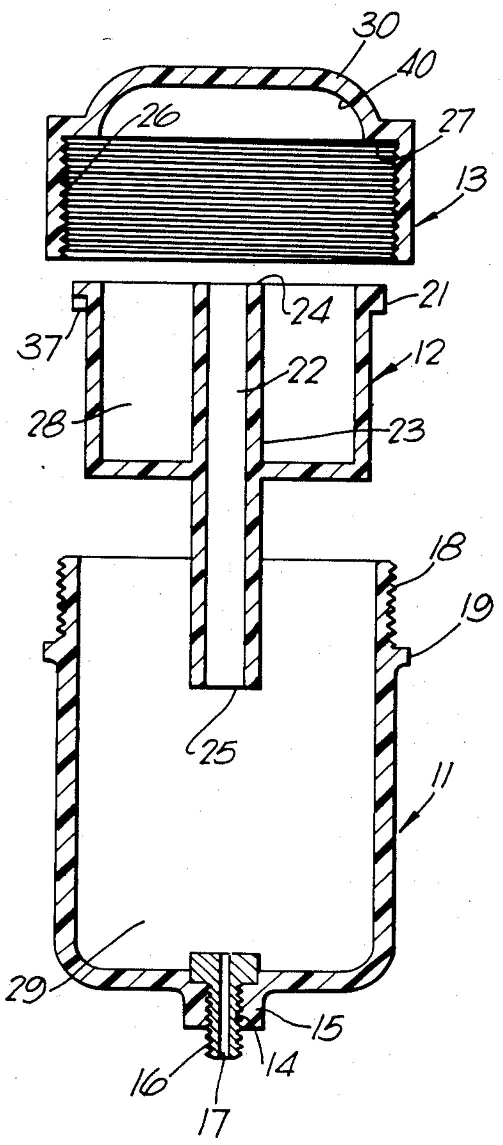
FIG. 1 is an exploded, axial section through the replenishment device.

The replenishment device of this example is generally cylindrical in form and comprises three separate parts, a body member 11, a tray member 12 and a cap member 13. A single hydraulic connection between the device and the hydraulic system with which it is to be used is provided by a nipple 14 which passes through a boss 15 at the center of the bottom wall or floor of the body 11. The nipple is secured and sealed in the boss and its projecting lower end is externally threaded at 16 so that it can make screw connection with the external system. Hydraulic fluid can pass in either direction through the bore 17 in the nipple. The uppermost end part of the body 11 is externally threaded at 18, immediately below which there is an outwardly projecting annular flange 19.

Figure 2:
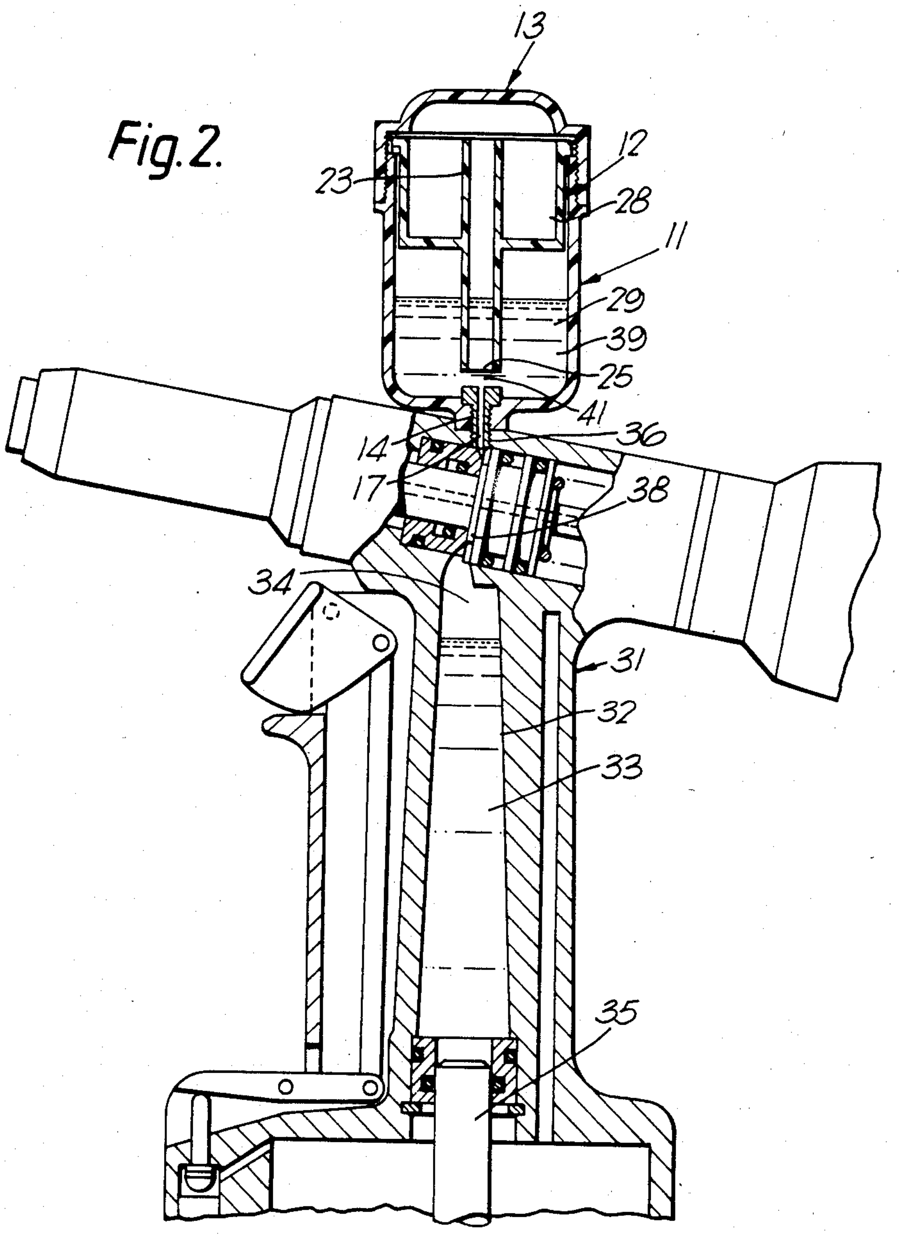
FIG. 2 is a section through the device before use when connected to a hand-held hydraulic riveting gun.
Figure 3:
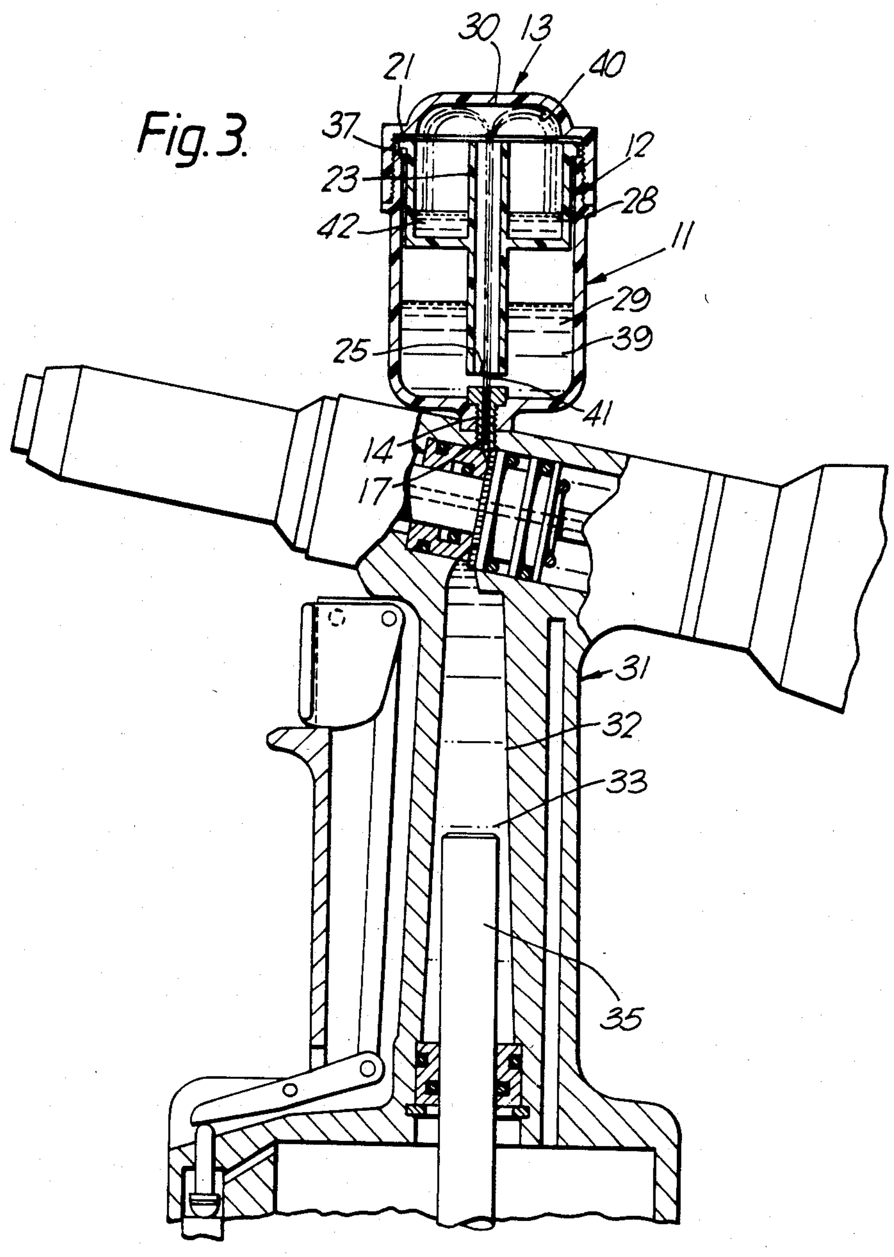
FIG. 3 is identical to FIG. 2 but shows the old hydraulic fluid being ejected into the first reservoir.
Figure 4:
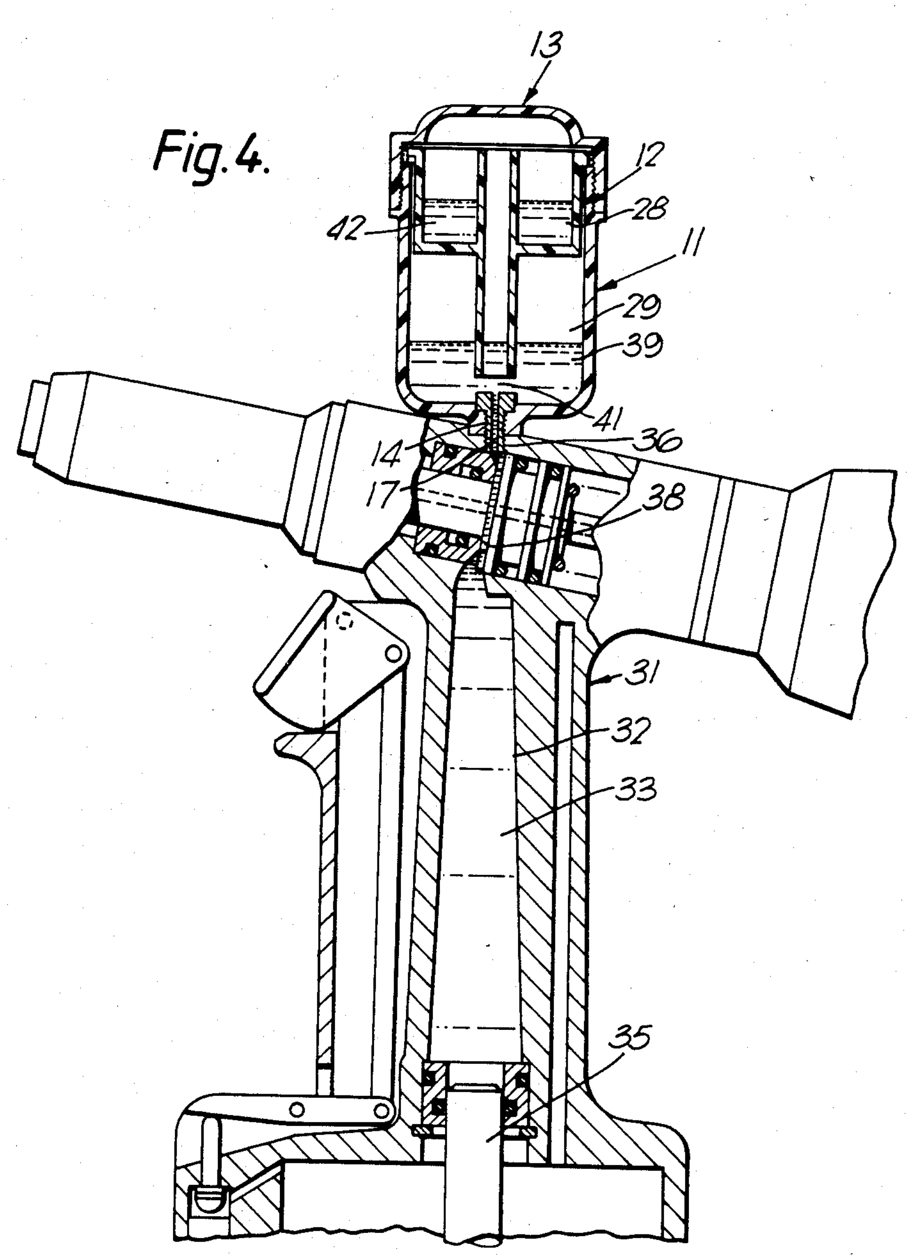
FIG. 4 is identical to FIG. 2 but shows new hydraulic fluid being drawn from the second reservoir.

The tray member 12 is of an external diameter slightly smaller than the internal diameter of the body 11, so as to be an easy fit therein. The upper end of the tray 12 has an outwardly projecting annular flange 21, which contacts the upper end of the body wall to support the tray within the uppermost part of the body, as illustrated in FIGS. 2, 3 and 4. The tray 11 includes a conduit provided by the bore 22 of a pipe 23 which is formed integrally with the tray 11. The pipe 23 extends axially of the tray 11, with the top end 24 of the pipe level with the top of the tray 11. The pipe also extends downwards below the bottom of the tray 12 by a sufficient distance that, when the tray 12 and the body 11 are assembled together as illustrated in FIG. 2 with the flange 21 of the tray resting on the top edge of the body, the bottom end 25 of the pipe is opposite the inner end of the nipple bore 17 but spaced from it axially. At a number of positions around the flange 21 is provided a gap or cut-out 37 in the lower face of the flange. These gaps allow air to pass between the interior of the tray 12 and the interior of the body 11, when tray and body are assembled together.

The cap 13 is internally threaded at 26 to engage with the external threading 18 on the body 11. The depth of the cap 13 is such that when the tray 12 has its flange 21 resting on top of the body wall and the cap is screwed onto the body, the bottom of the cap 13 contacts the body flange 19 to seal against it while there is a slight clearance between the top of the tray flange 21 and the underside 27 of the top wall of the cap. The center part of the top wall of the cap is extended upwards to form a dome 30 with a downwardly curving edge 40.

The body 11, tray 12 and cap 13 are made of moulded synthetic resin material, e.g. polycarbonate, and are advantageously transparent. The connection nipple 14 is made of steel.

In use, the three parts of the device are assembled together as described above and as illustrated in Figure 2. The tray 12 then provides a first reservoir 28 for holding old hydraulic fluid removed from the external hydraulic system, while the lowermost part of the body 11 provides a second reservoir 29 for holding new hydraulic fluid to be added to the system.

FIGS. 2, 3 and 4 illustrate the use of this replenishment device with a portable hydraulic system in the form of a hand-held hydraulically operated blind-riveting gun 31. The details of construction and operation of the gun are not important to the present invention, except that the gun includes a hydraulic pressure chamber 32 containing hydraulic fluid 33, and that the hydraulic fluid must often be replenished while the gun is being used in a workshop or on a factory floor, to fill the airspace 34 (FIG. 2) left due to leakage of the hydraulic fluid. The hydraulic fluid in the gun can be pressurized by actuating the gun to force a hydraulic piston rod 35 into the chamber 32 to displace the fluid 33.

The hydraulic system of the gun includes a priming hole 36 through which hydraulic fluid can be added to the system. The priming hole is normally sealed by a threaded screw plug, and the screw thread 16 on the connection nipple 14 is of course selected to match the screw thread in the gun priming hole. The priming hole is positioned to be at the highest part of the gun hydraulic system when the gun is held vertically, and it is connected to the hydraulic pressure chamber 32 through an annular space 38 around a reduced diameter portion of a slave piston in a slave cylinder.

The proceedure for using the device to replenish the hydraulic fluid in the gun is as follows.

The gun 31 is supported firmly in with its body in a vertical position as illustrated in FIG. 2, with the piston rod 35 in the retracted position. The sealing screw plug is removed from the priming hole 36. The replenishment device is dismantled, and the body portion 11 alone is offered up to the gun, and connection nipple 14 is screwed into the priming hole 36 so that they seal together. The body portion is also thereby supported in a vertical position on the gun.

A suitable quantity of new hydraulic fluid is then poured into the body portion 11 of the device. In this example the fluid level comes about one third of the way up the body portion. A mark or level indicator may be provided on the side of the body portion 11 to indicate the required level of fluid.

New hydraulic fluid does not run through the bore 17 of the connection nipple 14, due to viscosity and surface tension of the fluid, and the small diameter of the bore 17. The remaining parts of the replenishment device are then assembled, by placing the tray member 12 in the top of the body member 11, and screwing on the cap member 13, as previously described. The position is then as illustrated in FIG. 2. It will be seen that the new hydraulic fluid 39 in the second reservoir 29 provided by the body member 11 covers the lowermost part of the tray member pipe 23. The bottom end 25 of the pipe is opposite and immediately above the upper, inner end of the bore 17 through the connection nipple, but spaced away axially from it. The second reservoir 29 communicates with the connection nipple bore 17 via the space 41 between the bottom 25 of the pipe 23 and the top of the connection nipple. This space therefore provides an exit port from the second reservoir 29. Similarly the bottom end 25 of pipe 23 provides an entry post to the first reservoir 28.

The hydraulic fluid in the gun is now pressurised by actuating the gun mechanism to drive the piston rod 35 upwardly into the hydraulic chamber 32. This displaces the old hydraulic fluid 33 and the air 34 above it. First the air, and then the old hydraulic fluid, are expelled from the gun through the connection nipple bore 17 at a considerable linear speed. They emerge from the top of the bore 17 as a high speed stream, and have sufficient momentum to pass vertically upwards into the bottom end 25 of pipe 23, and up the whole length of pipe 23. This high speed upward passage of air and old hydraulic fluid will carry with it the part of the new hydraulic fluid within the lower end of pipe 23, and also may well suck in and entrain with it some new hydraulic fluid from the second reservoir, through the exit port provided by the space 41. However it is found that no old hydraulic fluid or air (or only a negligible quantity) enters the second reservoir to contaminate the new hydraulic fluid 39. The air and hydraulic fluid passing up the pipe 23 is ejected from the top end 24 of the pipe and hits the underside of the cap 30, which acts as a deflector to direct the hydraulic fluid 42 down into the first reservoir 28. This is illustrated in FIG. 3. Since the old hydraulic fluid 42 in the first reservoir is below the top end 24 of the pipe 23, it is trapped in the reservoir and cannot return down the pipe 23. The entry of air and fluid into the second reservoir 28 will displace air already in the latter, which can pass between the flange 21 and the cap 13, through the gaps 37 in the flange 21, and down between the outside wall of the tray 12 and the inside wall of the body 11, and into the second reservoir 29. At this time this reservoir still contains new hydraulic fluid, and the air inside the device may rise in pressure by a small amount (about 0.1 bar), since the bottom edge of the cap 11 effectively seals against the body flange 14 and prevents the escape of air.

The hydraulic fluid in the gun is now depressurised (i.e. has negative hydraulic pressure applied to it) by actuating the gun mechanism to retract the piston rod 35 from the hydraulic chamber 32. This draws new hydraulic fluid 39 from the second reservoir 29 through the exit port provided by the space 41 and down through the bore 17 of the connection nipple, into the hydraulic system of the gun, to fill it up with hydraulic fluid. This is the position illustrated in FIG. 4.

It may be that there was so much air space 34 in the gun's hydraulic system that a single stroke of the piston rod 35 is insufficient to expel all the air (which will be apparent because no old hydraulic fluid will be seen, through the transparent walls of the replenishment device, to have entered the first reservoir 29) if so, the piston rod may be given a second stroke, to expel the remainder of the air and replace it by new hydraulic fluid. The volume of new fluid initially poured into the second reservoir 29 is arranged to be sufficient to accommodate this. In order to ensure that all air has been removed from the hydraulic system, it is necessary to check that old oil without air bubbles is entering the first reservoir.

When the gun hydraulic system is thus full of hydraulic fluid, the replenishment device is unscrewed from the priming hole 36 and replaced by the sealing screw plug. The replenishment device is dismantled, the old fluid is disposed of, and the device is cleaned ready for re-use.

It will be seen that this device enables the replenishment of hydraulic fluid, in a system, in a very simple operation. The device can be connected to the hydraulic system through a single connection to an existing priming hole, and contains no non-return valves or on-off valves.

Figure 5:
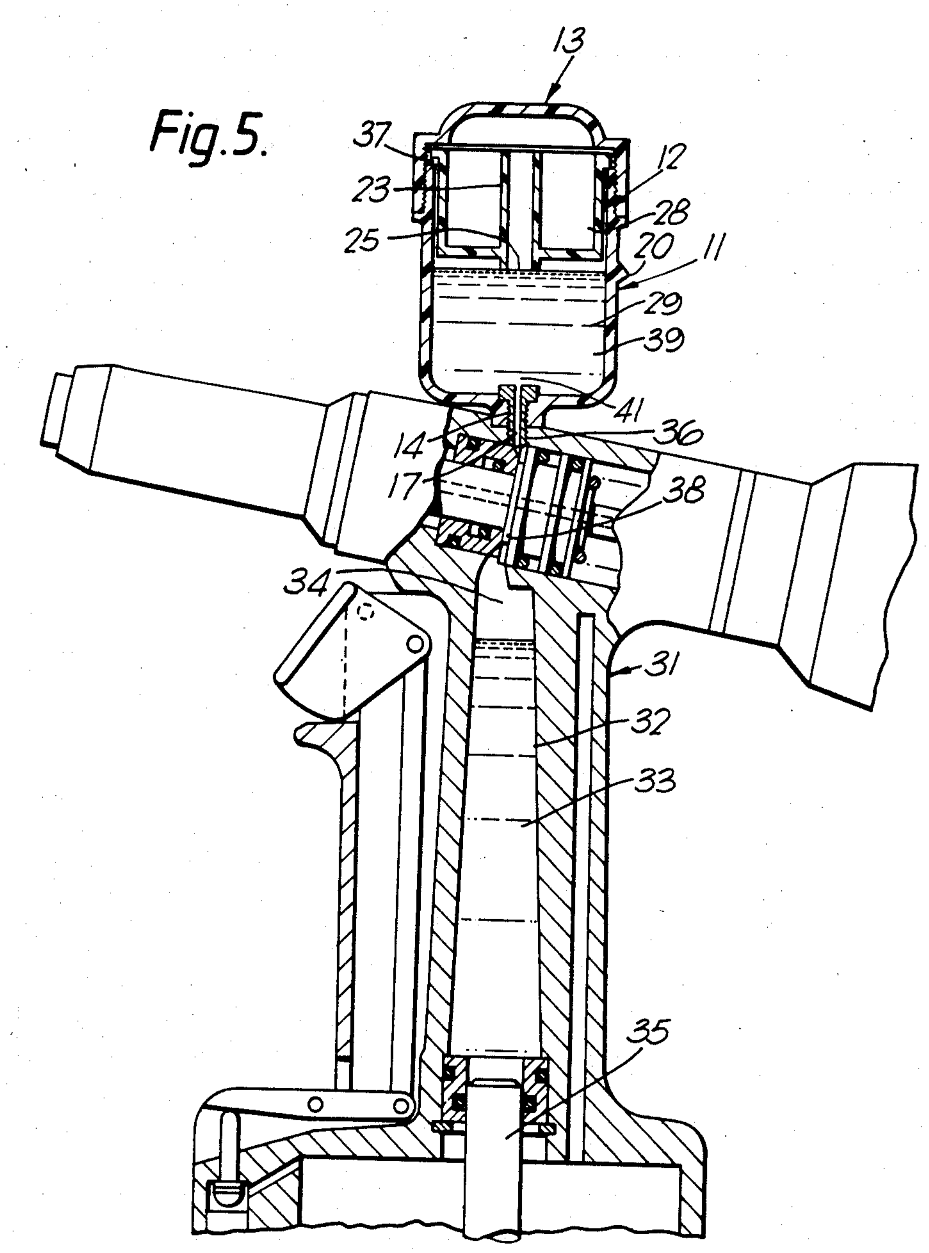
FIG. 5 is similar to FIG. 2 but illustrates a slightly modified embodiment.

FIG. 5 shows a slight modified version, in which the tray pipe 23 does not project so far downwards into the second reservoir 29. The lower end 25 of the pipe is no lower than the level of the new hydraulic fluid 39 in the reservoir 29, and this level is indicated by a mark or level indicator 20 moulded into the outside of the wall of the body member 11, which is transparent. The space above the connection nipple 14 and below the lower end 25 of the pipe 23 is thus much greater than in the example illustrated in FIG. 2, and it is believed that this overcomes a problem sometimes found in use of the example of FIG. 2, in which, when the external hydraulic system is depressurised, it sometimes happens that a bubble of air is sucked down the tube 23 into the connection bore 17, which is unacceptable. With the reduced downwards extent of the tube 23, this problem does not occur. The old hydraulic fluid and/or air still enters the bottom end 25 of the pipe 23 without contaminating the new hydraulic fluid 39.

The invention is not restricted to the details of the foregoing example and modification. For instance, the tray pipe 23 could extend downwardly by any suitable distance, which provides the correct functioning of the device, whether the pipe enters the new hydraulic fluid, just touches it, or does not reach the level of the new hydraulic fluid. The pipe could extend downwards only as far as the bottom of the tray member 12, so that it does not actually project into the second reservoir.

It is believed that the problem referred to above could alternatively be overcome by increasing the size of the gaps 37 through which air flows from the first reservoir to the second reservoir, whilst leaving the bottom 25 of the pipe 23 substantially in the position illustrated in FIG. 2.

I claim:

1. A hydraulic fluid replenishment device for replenishing hydraulic fluid in a hydraulic system, comprising:

a first reservoir for holding old hydraulic fluid removed from the system;

a second reservoir for holding new hydraulic fluid to be added to the system;

a single hydraulic fluid connection for connecting the replenishment device to the hydraulic system, whereby old hydraulic fluid enters the device through said connection and new hydraulic fluid leaves the device through said connection;

an entry port to the first reservoir, said entry port being opposite said hydraulic fluid connection;

means for trapping old hydraulic fluid, said old hydraulic fluid having entered the first reservoir through the entry port, against return through the entry port;

whereby, when the replenishment device is connected to the hydraulic system by means of said single connection and the hydraulic system is pressurised by being subjected to positive hydraulic pressure, at least one of air and old hydraulic fluid enters the device at speed through the single connection and due to its speed and momentum passes through the entry port into the first reservoir and at least the old oil is trapped therein;

and whereby when the hydraulic system is thereafter depressurised by being subjected to negative hydraulic pressure, new hydraulic fluid is drawn through the single connection from the second reservoir into the hydraulic system.

2. A hydraulic fluid replenishment device for replenishing hydraulic fluid in a hydraulic system, comprising:

a first reservoir for holding old hydraulic fluid removed from the system;

a second reservoir for holding new hydraulic fluid to be added to the system;

a single hydraulic fluid connection for connecting the replenishment device to the hydraulic system, whereby old hydraulic fluid enters the device through said connection and new hydraulic fluid leaves the device through said connection;

an entry port to the first reservoir, said entry port being opposite said hydraulic fluid connection;

means for trapping old hydraulic fluid, which said old hydraulic fluid having entered the first reservoir through the entry port against return through the entry port;

an exit port from the second reservoir adjacent the single connection;

whereby, when the replenishment device is connected to the hydraulic system by means of said single connection and the hydraulic system is pressurised by being subjected to positive hydraulic pressure, at least one of air and old hydraulic fluid enters the device at speed through the single connection and due to its speed and momentum passes through the entry port into the first reservoir and at least the old oil is trapped therein;

and whereby when the hydraulic system is thereafter depressurised by being subjected to negative hydraulic pressure, new hydraulic fluid leaves the second reservoir through the exit port and is drawn through the single connection into the hydraulic system.

3. A device as claimed in claim 1 or claim 2 wherein said means for trapping old hydraulic fluid in the first reservoir is provided by a conduit having a lower end and connecting the entry port to a portion of the first reservoir spaced above a bottom of said first reservoir.

4. A device as claimed in claim 3 wherein the entry port is provided at the lower end of said conduit.

5. A device as claimed in claim 1 or claim 2 wherein the first reservoir is positioned above the second reservoir and a conduit having a lower end extends down into the second reservoir, said entry port being provided at the lower end of said conduit.

6. A device as claimed in claim 1 or claim 2 which is sealed except for said hydraulic connection, and including air bleed means for allowing air, which is displaced from the first reservoir by old hydraulic fluid entering said first reservoir, to enter the second reservoir above the surface of the new hydraulic fluid therein.

7. A device as claimed in claim 1, which comprises:

a body member having an upper part, a lower end and a lower part, and a tray member having a top;

the body member having said single hydraulic connection provided at said lower end, and the lower part of the body member comprising the second reservoir;

the tray member being positioned in the upper part of the body member and comprising the first reservoir, and including a conduit having a lower end, said conduit extending downwards towards the single hydraulic connection, so that the lower end of the conduit comprises the entry port, said conduit also extending upwards towards the top of the tray member thereby to comprise the means for trapping the old hydraulic fluid therein.

8. A device as claimed in Claim 2, which comprises:

a body member having an upper part, a lower end and a lower part, and a tray member having a top;

the body member having said single hydraulic connection provided at said lower end, and the lower part of the body member comprising the second reservoir;

the tray member being positioned in the upper part of the body member and comprising the first reservoir, and including a conduit having upper and lower ends, said conduit extending downwards towards the single hydraulic connection, so that the lower end of the conduit comprises an entry port, wherein a space between the lower end of the conduit and the single hydraulic connection comprises the exit port from the second reservoir, said conduit also extending upwards towards the top of the tray member thereby comprising the means for trapping the old hydraulic fluid therein.

9. A device as claimed in claim 7 or claim 8, also including a cap member which closes the upper end of the body member.

10. A device as claimed in claim 9, wherein the cap member comprises a means for retaining the tray member in the body member.

11. A device as claimed in claim 10, wherein an underside of the cap member comprises means to deflect into the tray member old hydraulic fluid leaving the upper end of the conduit.

12. A device as claimed in claim 7 or claim 8, wherein the tray member has a bottom and the conduit extends downwards towards the hydraulic connection only as far as the bottom of the tray member.

13. A device as claimed in claim 7 or claim 8 wherein the conduit does not extend downwards below the level of the new hydraulic fluid in the second reservoir.

14. A device as claimed in claim 7 or claim 8, wherein the body member is provided with an index or mark indicating the level of the new hydraulic fluid, and wherein the conduit does not extend downwards below said index or mark.

15. A device as claimed in claim 7 or claim 8, wherein said conduit extends downwardly below the level of the new hydraulic fluid in the second reservoir.

16. A device as claimed in claim 2, wherein the exit port from the second reservoir is positioned between the single connection and the entry port to the first reservoir.

* * * * *